United States Patent [19]

Sonntag

[11] Patent Number: 5,040,795
[45] Date of Patent: Aug. 20, 1991

[54] COMPOSITION FOR COATING THE EXTERNAL SURFACE OF SPORT BALLS AND BALLS THUS OBTAINED

[75] Inventor: Jean-Marie Sonntag, Kehl, Fed. Rep. of Germany

[73] Assignee: Adidas Fabrique de Chaussures de Sport Sarl, Dettwiller, France

[21] Appl. No.: 483,453

[22] Filed: Feb. 22, 1990

Related U.S. Application Data

[62] Division of Ser. No. 312,882, Feb. 17, 1989, abandoned.

[30] Foreign Application Priority Data

Feb. 9, 1988 [FR] France .................................. 88 02031

[51] Int. Cl.$^5$ ............................................. A63B 37/00
[52] U.S. Cl. ................................ 273/58 J; 273/58 R; 273/58 K; 273/58 B
[58] Field of Search ............... 273/58 J, 58 B, 58 BA, 273/65 EE, 65 EG, 65 EC, 60 R, 60 A, 60 B, 235 A, 58 K, 58 R; 524/492, 493

[56] References Cited

U.S. PATENT DOCUMENTS 2,078,881  4/1937  Münzinger ..................... 273/235 A
4,285,846  8/1981  Hardy et al. ........................ 524/492

FOREIGN PATENT DOCUMENTS 54-65638  5/1979  Japan .

Primary Examiner—Joseph L. Schofer
Assistant Examiner—R. H. Delmendo
Attorney, Agent, or Firm—Cushman, Darby & Cushman

[57] ABSTRACT

A sport ball is provided with an outer ball surface which has portions having a roughness higher than the portions of the surface. These rougher portions are obtained by applying, using a serigraphic process, a coating composition comprising a binder and an inorganic builder, the latter advantageously including a combination of substances having hydrophilic and hydrophobic properties.

15 Claims, 1 Drawing Sheet

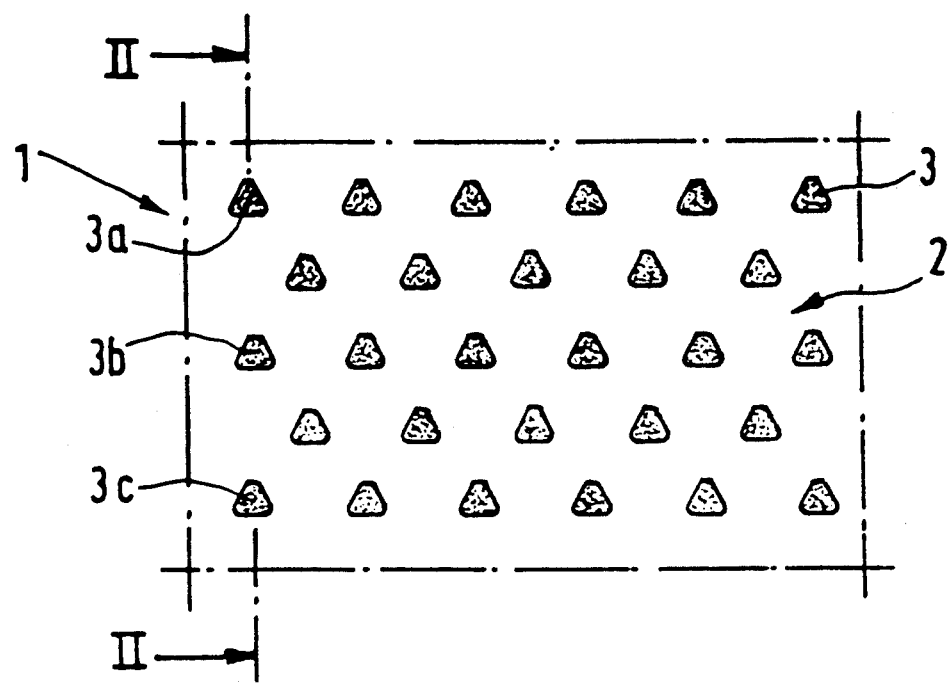
FIG.1
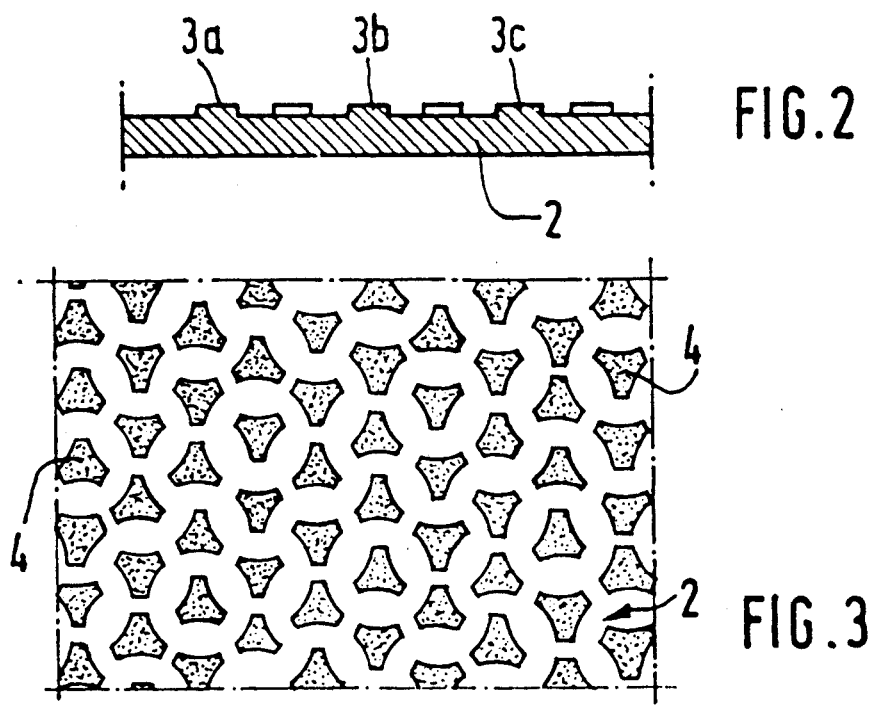
FIG.2
FIG.3

COMPOSITION FOR COATING THE EXTERNAL SURFACE OF SPORT BALLS AND BALLS THUS OBTAINED

PRIOR APPLICATION

This appliction is a division of U.S. patent application Ser. No. 312,882 filed Feb. 17, 1989, now abandoned.

BACKGROUND OF THE INVENTION

The invention belongs to the field of leisure and sport articles. It relates more particularly to a composition which may be applied for coating the external outer surfaces of sport balls to provide the latter with improved properties, especially when such balls are used for playing in wet or damp conditions. The invention is also relative to the balls thus obtained.

There are numerous kinds of balls which distinguish from each other especially as regards the kind of their internal structure (mono-shelled frame or bag) or their external lining (hand-seamed balls or non hand-seamed balls). The constitutive materials of the external surfaces of the balls are also very different, made from conventional materials, such as leather, up to synthetic materials, such as polyurethane and polyvinyl chloride. In most cases, the external linings are wear layers and also have an aesthetic function. They also improve the ball-managing properties which are very important for the players.

Those skilled in the art know that, in view of the nature of the present linings, the balls are not always satisfactory to be used either in foot sports or hand sports. A better ball-catching propensity is always required, and, for sports in the open, these have to be balls which suit the various conditions of play, and even severe conditions, for example when playing on damp playgrounds, and even on melting snow.

An object of the invention is to treat the external surface of sports balls to provide them with an improved grip and also to enable the balls to be optionally used in damp and wet conditions, particularly to provide them a smoother gliding and prevent the balls from running along the playground.

Another object of the invention is to provide a composition for coating the external surfaces of sport balls, the composition comprising a binder or matrix able to firmly adhere to the ball surface and including an inorganic particulate builder or filler comprising a substance having a hydrophilic property, a high surface area and a low specific gravity.

Upon applying such a composition, the ball surface becomes rough, specially when playing in wet or damp conditions.

For the composition of the invention, use can be made of binders or matrixes of various kind. The first condition to fulfill is that the binder be able to firmly adhere to the ball surface and, in most cases, it is embodied as a liquid having a suitable viscosity for facilitating application of the binder to the external surfaces of the balls. This kind of binder may or may not include solvents, and, when the latter are present, they leave, upon application, a strong film at the surface of the substrate, i.e., on the ball. When it is desired to obtain good properties in use for sports in the open air, it is preferable that the binders or matrixes be substantially uneffected by water, that means which their properties are not basically modified in the playing conditions on a wet or damp playground, even in case of melting snow. Particularly, the binder might have a sufficient stability in the presence of water, and, for example, not to be subjected to any swelling effect or any further similar variation. It may also be advantagous that, due to the chemical nature thereof, the binder have a good withstanding to cold. The person of ordinary skill in the art has at their disposal a rather large number of products to attain such objects, these products being especially available in the field of paints and varnishes. The binder may also be transparent or colored, since it is generally preferable, to maintain the customary external aesthetic apparence of the ball surface, to use transparent binders or matrixes.

By way of illustrative examples, that are not limitative as regards the usable binders or matrixes, one may cite products based on polyurethane, either in solution or in emulsion, products based on styrene-butadiene, of butadiene-acrylonitrile, or acrylic-based products such as polyacrylates and polymethacrylates. Better results have been obtained with binders based on polyurethane, particularly those having NCO groups coming from aliphatic bases. Such binders are transparent, have a high resilience, good adhesive properties, and a better stability to cold. They may also be easily applied in a solvent medium. Examples of products which have been satisfactory are: the transparent varnishes 870 428/5 (which is commercially available from Keck Chimie) associated to the curing agent D33 (also available from Keck Chimie). It has been also established that such products have a good stability to ultraviolet rays.

An essential constituent of the composition according to the invention is an inorganic particulate builder which is distributed within the binder. It comprises a substance having a hydrophilic property for which the binder becomes thixotropic, such that at the locations where the composition is applied, spreading is limited and then a projection effect is produced at the surface of the ball. Another interesting function of the substance having a hydrophilic nature or behaviour, is to substantially produce an optimal roughness of the ball surface in damp and wet conditions. It is also suitable that the inorganic substance have a high surface area. That means that this surface area is higher than 40 m$^2$/g, preferably 200 m$^2$/g, for instance in the vicinity of 150 m$^2$/g. Another advantageous feature is low density. That means that the bulk specific gravity (i.e. when not compressed) of the substance must be lower than 100 g/l, preferably 50–70 g/l, for example about 50 g/l. Another parameter that can be taken into acount is the fineness of the builder particles. In fact, the particles must be kept at the ball surface, and, further, the roughness must not be in excess, although it would be perceptible to touch and becomes more important in the playing conditions on damp or wet playground. Thus, use will be made preferably of fine particles which have a medium size from about 4 to 50 nanometers, particularly from about 5 to 30 nanometers.

Among the inorganic materials able to comply with these requirements, are glass and silica. The best results have been obtained with compounds of pyrogenated silica, one illustrated example of such compounds being the product commercially available from WACKER CHEMIE under the tradename WACKER HDK V 15.

It has been found that the coating according to the invention provides the balls with substantially improved properties, especially in the playing conditions on damp and wet playground, and possibly on melting snow. The gliding effect is smoother and the bouncing behaviour is better. When touching sport balls that have been modified in accordance with the principles of the present invention, the catch is better that is favorably felt by the goal keepers, when the invention is applied to football or soccer balls.

According to another feature of the invention, it is yet possible to improve the surface roughness by means of a composition for coating the external surface of the sport ball, based on a binder or matrix able to firmly adhere to the ball surface and comprising an inorganic particulate builder comprising the combination of a substance having a hydrophilic property, a high surface area and a substance having a hydrophobic property, both substances having a low specific gravity.

Thus, the invention proposes to combine with the substance having a hydrophilic nature or behaviour, which has been previously described, another builder substance whose function is into be integrated to the composition applied onto the ball and to provide this composition with optimal roughness having hydrophobic property. The specific gravity of this second substance will be also low, that is lower than 0.4 kg/dm$^3$, preferably 0.2 kg/dm$^3$ and, for example, in the range from about 0.1 to 0.2 kg/dm$^3$, when said substance is not compressed. It is also advisable that the hydrophobic substance be formed as fine particles whose medium size is from about 10 to 200 microns particularly from about 50 to 120 microns, for example, about 60 microns of diameter. Inorganic substances which have given excellent results are substances based on glass or silica, which are available as microspherules, filled with air and withstanding compression. Such products are available to those skilled in the art, for instance under the tradename Q CELL 600 (available from the P.Q. Corporation) and B 23/500 or B 28/750 available from the 3M company.

They are products made of alkaline and/or alkaline-earth silicates or borosilicates. By way of example, the composition of hollow microspherules Q CELL is the following one, the numbers been given in weight %:

$SiO_2$:60.5
$Na_2O$:22.5
$B_2O_3$:11.4
$K_2O$:0.5
$Al_2O_3$:0.2
$Fe_2O$:0.1
$CaO$:0.1
$H_2O$:5

The addition of inorganic builders, for example of a compound made of pyrogenated silica and of glass microspherules, enables optimal results to be obtained to coat balls, particularly footballs, intended to be used on damp or wet playgrounds.

It has previously been stated that the binder or matrix could be transparent or colored. To provide the composition according to the invention with particular properties, it is also possible to add to the composition other additives, such as dyes or stabilizers. The person of ordinary skill in the art is able to select such additives, with respect to the nature of the binder to which they have to be combined. Now, many products are at disposal, which are able to provide an additional protection against photochemical damage. The addition of a dye may also improve the aesthetic effect by displaying visually the locations on the ball surface, on which the coating has been applied. Further, the touching roughness, at least at certain locations, of the external surfaces of the balls according to the invention can accordingly be characterized also by the presence of discontinous coatings having an appearance and a color which are different with respect to the remainder of the surface.

The composition according to the invention is easy to embody. It may be prepared by introducing into the binder or matrix, the inorganic builder which is uniformly dispersed within, the binder or matrix for example, by mechanical stirring. When the builder comprises two substances, i.e. a substance having a hydrophilic nature or behaviour and a substance having a hydrophobic property, the introduction within the binder or matrix may be made randomly. Should any dye or stabilizer be used, it would also be introduced within the binder at any stage of manufacture of the composition.

The external surface of the ball is coated by means of the composition according to the invention using a generally known procedure. The coating may be carried out on the ball yet swollen, but preferably, the panels which will be then used as an external coating layer are coated in a flat condition.

The proper coating procedure is that of serigraphy or that of pad-process, the latter procedure consisting of contacting at fast rate the substrate to be coated, using an applying pad. According to the conventional procedure of serigraphy, a sieve plate is set at the surface of the ball, the sieve plate comprising ports which are more or less uniformly distributed thereon and the composition is applied through said sieve plate by any suitable means, for example, by brushing, by scrapping or by spraying.

The number and the size of the plate sieve-ports may be easily selected by those skilled in the art. When it is designed to obtain good behaviour on damp or wet playgrounds, it is essential to make a grate having a sufficent density of ponctual coatings, for example by using a sieve plate having a mesh opening from 20 to 300 microns and a mesh density from 20 to 200 by centimeter.

Thus, there is produced on the ball a film generally having a thickness from about 15 to 100 microns and comprising at locations which are preferably uniformly distributed, slightly rough patterns whose form and number correspond to the features (ports) of the sieve plate used during the coating process. Particularly good results have been obtained in footballs by using generally angular-shaped ports, while providing a discontinuous grate formed of elements having a surface area of about 12–15 mm$^2$ and separated from approximately 2 to 5 mm these elements having a roughness which is more important than that of the portion of the ball surface between one another. Due to the presence of the hydrophilic builder, the coating portions have a limited surface, without spreading, and the rough property of the binder is provided at the film surface, the builder being only partially embedded and protected into the film.

The person of ordinary skill in the art will understand that the present invention is applicable to any type of balls, whatever may be the nature of the surface of these balls. One application of the present invention comprises the use of the composition for coating laminate comprising an external layer made of conventional materials and a sublayer comprising at least a micro-porous material.

In fact, while made in one stage, the coating of the composition of the invention is sufficient to produce the desired results on the ball surface. However, if necessary, the coating procedure may be repeated at will.

The practical application conditions of the composition according to the invention would be modified with respect to the formulation thereof, and particularly with respect to the solid contents. As to the amount of inorganic builder, the weight amount with respect to the weight of binder or matrix, would depend on the nature of the formulation, taking also in account that the substance having a hydrophilic nature or behaviour is combined or not combined with the substance having hydrophobic property. When binders based on polyurethane and inorganic builders comprising a compound of pyrogenated silica are used, the builder amount is approximately from 30 to 70 g/kg. When the inorganic builder comprises silica or glass microspherules, as previously stated, their amount ranges from about 10 to 50 g/kg with respect to the total weight of the binder. These indications are only given by way of illustration, since those skilled in the art, by means of routine tests, may determine the builder amounts to embody, according to the results to be obtained and taking particularly into account the surface roughness which has to be obtained on the ball.

BRIEF DESCRIPTION OF THE INVENTION

Now, the invention will be illustrated without any limitation by means of the following examples and also with reference to the accompanying drawings, in which:

FIG. 1 is a front elevational view of a portion of a ball surface which has been treated according to the principles of the present invention FIG. 2 is a cross-sectional view along line II—II in FIG. 1;

FIG. 3 is a elevational front view of the ball surface according to an alternative form of the invention.

DETAILED DESCRIPTION

As shown in FIG. 1, the portion 1 of the ball surface comprises a conventional layer 2 and portions 3 obtained by coating the composition according to the invention, for instance 3a, 3b, 3c, having a roughness higher than the remaining of the surface onto the conventional layer 2, i.e., onto the external surface of the ball. The cross-section in FIG. 2 illustrates, along an enlarged and diagrammatic fashion, the raised patches or bumps 3a, 3b, 3c of the coating applied to the ball structure 2. As previously stated, the ball structure to be coated may be made of any materials (e.g., leather, or polyurethane).

FIG. 3 illustrates an alternative form which corresponds to the balls which have provided the best results. The distribution of the bumps 4 is somewhat different at the ball surface 2 than that illustrated in FIG. 1. The relative distributions of the generally triangular coated portions are preferably shaped, sized and distributed in accordance with the drawing.

In the following examples, use has been made of a composition of the invention for coating footballs comprising hand-seamed panels. FIG. 3 illustrates bumps 4 having a generally triangular shape, but any shape could be adopted. The bumps 4 are distributed along a disposition corresponding to the parts of the sieve-plate which has been used for the coating in accordance to the general procedure of serigraphy or pad-process.

In the particular case to be considered, the composition according to the invention includes as a binder, a transparent solution of a two-components polyurethane, based on aliphatic compounds. This product is commercially available from KECK CHIMIE under the tradename "Vernis Transparent 870428/5". It has a perfect capability to adhere to the ball surface, further as the latter is made of polyurethane. Besides it has a high resilience and a very good stability to cold.

The composition also contains an inorganic builder comprising 10 g/kg of a pyrogenated silica compound and 40 g/kg of glass microspherules. The pyrogenated silica compound is that commercially available from WACKER CHEMIE under the tradename WACKER HDK V 15, having a mean size of particles ranging from 5 to 30 nanometers, a surface area of about 150 $m^2/g$ and a specific gravity of about 50 g/l. It has been established that, during the coating process the lining based on polyurethane was indeed confined to the portions 3 corresponding to the openings of the sieve-plate meshes, the builder having a hydrophilic property providing the film with thixotropic property.

The roughness of the bumps 4 is further improved by the presence of glass microspherules in an amount of 40 g/kg of binder. In the selected example, this builder was formed of a product called Q CELL 600 sold by P.Q. CORPORATION. These are hollow glass microspherules filled with air and withstanding compression, having a density, without compresion, of about 0.18 $kg/dm^3$ and a mean particle size of about 60 microns of diameter. These microspherules provide an optimal surface roughness having a hydrophobic property.

Although the following feature is not critical in any way, there can be introduced within the coating composition a dye called Melio Perlglanz Powder which is commercially available from K.J. QUINN, which provides the coating composition protection against the photochemical decay. Due to the pearly colour thereof, this dye also provides the film with a beautiful aesthetic appearance, thereby also enabling the presence of coated portions 4, which are different in appearance from the remaining of the ball surface 2, to be clearly seen.

The application of the coating composition according to the invention has been carried out in a unique stage with a sieve-plate having a mesh opening of 143 microns.

Footballs thus obtained have been experimented with by a team of professional players in particularly severe playing conditions on a damp playground, and even in the presence of melting snow. It has been found that the behaviour of the footballs coated in accordance with the principles of the present invention was much more uniform than that of conventional footballs which were not coated with the composition of the invention. The balls according to the invention were sliding on the damp playground in a uniform fashion without providing wholly random paths known with conventional balls. Besides, the bouncing behaviour was also more normal and logical. The bumps of coating on the external surfaces of the footballs which were coated in accordance with the principles of the present invention also rendered easier the ball catches (stops by the goal-keepers).

The best results have been obtained when using as a substrate of ball surface, a laminate structure comprising an external layer and an internal micro-porous layer.

It has to be underlined that the precise indications which have been given hereinbefore have only an illustrative purpose and that the person of ordinary skill in the art may bring about, when practicing the present invention, numerous modifications without departing from its scope.

The person of ordinary skill in the art will also understand that the portion having a higher roughness may be build up at the ball surface in any manner and that the general linear distributions illustrated in the drawings are not limitative in any way. Very good results also have been practically obtained by building up star-shaped portions or by providing various locations each consisting of a central rough portion surrounded with similar portions. It would be sufficient to correspondingly modify the sieve-plate used for the coating procedure. Besides, these distributions of rough portions, particularly if the latter are slightly coloured, provide original visual effects on the ball surface.

What I claim is:

1. A sport ball having an external surface which is locally covered at a plurality of sites which are widely distributed over said surface, by an adhering coating composition, and which remains uncoated by said coating composition throughout a remainder which is interspersed between and among said sites; said coating composition comprising a binder having mixed therein at least one inorganic particulate builder which is a hydrophilic material, said hydrophilic material having a surface area of more than 40 m$^2$/g and a specific gravity of less than 100 g/l; said coating composition protruding from said surface as bumps and providing said sport ball with a greater surface roughness at said sites than does said external surface on said remainder of said external surface.

2. The sport ball of claim 1, wherein: said coating composition further comprises at least one builder which is a hydrophobic material mixed into said binder, said hydrophobic material having a specific gravity of about 0.1 to less than 0.4 kg/dm$^3$.

3. The sport ball of claim 1, wherein:
said binder is at least one compound selected from the group consisting of polyurethane, styrene-butadiene, butadiene-acrylonitrile, polyacrylate and polymethacrylate.

4. The sport ball of claim 1, wherein:
said hydrophilic material has a particle size of about 4-50 nm diameter.

5. The sport ball of claim 4, wherein:
said hydrophilic material is at least one inorganic compound selected from the group consisting of glass and pyrogenated silica.

6. The sport ball of claim 5, wherein:
said hydrophilic material is present in a said binder at a ratio of hydrophilic material to binder of about 30 to 70 g/kg.

7. The sport ball of claim 2, wherein:
said hydrophobic material has a particle size of about 10-200 microns in diameter.

8. The sport ball of claim 7, wherein:
said hydrophobic material is air filled and is at least one inorganic material selected from the group consisting of air-filled microspherules of glass and air-filled microspherules of silica.

9. The sport ball of claim 8, wherein:
said glass in an alkaline or alkaline earth silicate or borosilicate glass.

10. The sport ball of claim 8, wherein:
said hydrophobic material is present in said binder at a ratio of hydrophobic material to binder of about 10 to 50 g/kg.

11. The sport ball of claim 1, wherein:
each said site has a width of about 20-200 microns, each said bump projects outwards about 15-100 microns from said external surface, and said bumps are spaced from one another by about 2-5 mm.

12. The sport ball of claim 1, wherein:
said binder is substantially transparent.

13. The sport ball of claim 1, wherein:
said coating composition further comprises a die mixed into said binder, whereby said coating composition is provided with a color which is visually distinctively different from that of said external surface.

14. The sport ball of claim 1, wherein:
said coating composition further comprises a stabilizer against photochemical decay of said binder.

15. The sport ball of claim 1, configured as a soccer ball.

* * * * *